US012674655B2

(12) United States Patent
McShane

(10) Patent No.: US 12,674,655 B2
(45) Date of Patent: Jul. 7, 2026

(54) INDUCTIVE SENSOR INTERFACE FOR ON-WAFER PLATING THICKNESS MEASUREMENTS

(71) Applicant: APPLIED Materials, Inc., Santa Clara, CA (US)

(72) Inventor: Carl X. McShane, Marion, MT (US)

(73) Assignee: APPLIED Materials, Inc., Santa Clara, CA (US)

( * ) Notice: Subject to any disclaimer, the term of this patent is extended or adjusted under 35 U.S.C. 154(b) by 175 days.

(21) Appl. No.: 18/772,855

(22) Filed: Jul. 15, 2024

(65) Prior Publication Data

US 2026/0016280 A1     Jan. 15, 2026

(51) Int. Cl.
*G01B 7/06*        (2006.01)

(52) U.S. Cl.
CPC .......... *G01B 7/105* (2013.01); *G01B 2210/56* (2013.01)

(58) Field of Classification Search
CPC ................ G01B 7/105; G01B 2210/56; G01B 2210/60; G01B 7/12; G01B 7/06; G01B 7/26; G01B 7/28; G01B 7/281; G01B 7/00; G01B 7/13
See application file for complete search history.

(56) References Cited

U.S. PATENT DOCUMENTS

| | | | |
|---|---|---|---|
| 2002/0053904 A1* | 5/2002 | Chen ..................... | G01B 7/085 |
| | | | 324/230 |
| 2010/0120333 A1* | 5/2010 | Sin ......................... | B24B 37/013 |
| | | | 451/287 |
| 2018/0226304 A1* | 8/2018 | Chen ..................... | H10P 74/203 |
| 2021/0048550 A1* | 2/2021 | Hoeger ................ | B23K 9/1087 |

* cited by examiner

*Primary Examiner* — Alvaro E Fortich
(74) *Attorney, Agent, or Firm* — CHRISTENSEN O'CONNOR JOHNSON KINDNESS PLLC

(57)          ABSTRACT

A sensor interface configured to determine a thickness of plating on a wafer, including an inductance to digital converter (LDC) configured to receive an input from a coil sensor, and configured to convert the input to data, a microcontroller (MCU) configured to receive the data, a digital to analog convertor (DAC) configured to convert the data to an analog signal, and an amplifier configured to output a 0-10V analog signal. Further, a method of using the sensor interface including converting an oscillation frequency into data with the LDC, reading the data into the MCU, converting the data to an analog signal with the DAC, providing a selectable voltage offset and gain of the analog signal with the amplifier, outputting a 0-10V analog signal with the amplifier, and determining the thickness of plating on the wafer.

20 Claims, 7 Drawing Sheets

*HIGH FREQUENCY*
*10 MHz*

*VERY HIGH*
*FREQUENCY*

INDUCTIVE SENSOR INTERFACE FOR ON-WAFER PLATING THICKNESS MEASUREMENTS

BACKGROUND

The thickness of plate up, and especially conductive plate up, on a semiconductor wafer can have a significant impact on the overall electrical conductivity of the assembly. As the thickness of the metal plating layer increases, the electrical conductivity increases as well. Thinner plating layers limit the cross-section of pathways for current to flow, resulting in lower electrical conductivity. Traditionally, the thickness of plate up on wafers after the electroplating process is measured with an inductance sensor and an analog circuit. These circuits sensors are only able to target a narrow functional band of measurement when determining the thickness of plate up on wafers. Further, the measurements are susceptible to excessive noise and drift. However, analog sensors are also often directly incorporated into metrology chambers, and other systems for determining wafer specifications. Because of this, accurate measurements of the thickness of wafer plating (metallization), and thus, the overall desired electrical conductivity of the assembly, can be difficult to achieve.

Accordingly, sensor interfaces, systems, and methods for accurately measuring thickness of plate up on wafers are needed.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, disclosed herein is a sensor interface configured to determine a thickness of plating on a wafer, including an inductance to digital converter (LDC) configured to receive an input from a coil sensor, and configured to convert the input to data, a microcontroller (MCU) configured to receive the data, a digital to analog convertor (DAC) configured to convert the data to an analog signal, and an amplifier configured to output an analog signal.

In some embodiments, the amplifier is configured to transmit the 0-10V analog signal to an analog input, where the analog input is configured to determine the thickness of the wafer plating based on an amplitude of the analog signal.

In some embodiments, the LDC has an oscillation input range of about 1 kHz to 10 MHz. In some embodiments, the LDC has a 1-100 kΩ alternating current (AC) resistance range. In some embodiments, the data is a 28-bit wide data frame. In some embodiments, the input is an oscillation frequency. In some embodiments, the data is transmitted through an inter-integrated circuit (I2C) bus address.

In some embodiments, the DAC converts the data to a 0-2.5V analog signal.

In another aspect, disclosed herein is a metrology chamber configured to retain a wafer chuck, the metrology chamber including a swing arm, a sensor head assembly comprising a coil sensor configured to measure an oscillation frequency of a wafer, a swing arm configured to position the sensor head assembly above the wafer chuck, and a sensor interface configured to determine a thickness of plating on a wafer, where the sensor interface includes an inductance to digital converter (LDC) configured to receive an input from a coil sensor, and configured to convert the input to data, a microcontroller (MCU) configured to receive the data, a digital to analog convertor (DAC) configured to convert the data to an analog signal, and an amplifier configured to output a 0-10V analog signal, and where the metrology chamber further includes an analog input configured to determine the thickness of the wafer plating based on the 0-10V analog signal.

In some embodiments, the metrology chamber further comprises a sensor housing configured to retain the sensor interface.

In some embodiments, the sensor interface comprises a printed circuit board (PCB).

In some embodiments, the coil sensor has a diameter of about 1 to 3 mm. In some embodiments, the swing arm is configured to position the sensor head assembly about 1 to 3 mm above the wafer chuck.

In yet another aspect, disclosed herein is a method of determining a thickness of plating on a wafer with a sensor interface comprising an inductance to digital converter (LDC), a microcontroller (MCU), a digital to analog convertor (DAC), and an amplifier, the method including converting an oscillation frequency into data with the LDC, reading the data into the MCU, converting the data to an analog signal with the DAC, providing a selectable voltage offset and gain of the analog signal with the amplifier, outputting a 0-10V analog signal with the amplifier, and determining the thickness of plating on the wafer.

In some embodiments, the method further comprises determining the oscillation frequency with a coil sensor.

In some embodiments, determining the thickness of plating on the wafer comprises determining the thickness based on the 0-10V analog signal with an analog input.

In some embodiments, the LDC has an oscillation input range of about 1 kHz to 10 MHz. In some embodiments, the LDC has a 1-100 kΩ alternating current (AC) resistance range. In some embodiments, the data is a 28-bit wide data frame.

In some embodiments, the DAC converts the data to a 0-2.5V analog signal.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Disclosed herein are sensor interfaces, systems, and methods for determining accurate plate up thickness on wafer.

These inventive methods and systems reduce noise and drift by using digital measurements, and provide a broad range of measurement capability. In some embodiments, disclosed herein is a metrology chamber configured to measure the thickness of wafer plate up (also referred to as wafer plating or wafer metallization). The metrology chamber may include a coil sensor configured to measure a change in inductance of the wafer plate up. The coil sensor then transmits the measured inductance to an inductance to digital convertor (LDC). Generally, the precision of the LDC may be influenced by the diameter of the coil sensor and/or the distance between the coil sensor and a wafer (or target). Further, the oscillation frequency of the coil sensor can directly affect the sensing depth of the coil sensor. A lower frequency, such as 10 kHz can increase a sensing depth of penetration to beyond a front layer of the wafer and into a substrate of the wafer. In some embodiments, the system described herein utilizes an LDC with an oscillation input range of between about 1 kHz and about 10 MHz. In some embodiments, the system further includes a sensor coil having a diameter of between about 1 mm and 3 mm.

In some embodiments, the LDC may transmit data (also referred to herein as "frame data") to a microcontroller (MCU). The MCU can read data from the LDC and send the data to a digital to analog converter (DAC). The DAC may convert the data to an analog signal, capable of being read by an analog sensor (or "analog input") integrated into the metrology chamber. In some embodiments, the analog signal may further be transmitted to an amplifier, which adjusts the raw DAC analog signal into a 0-10V signal readable by the analog input integrated into the metrology chamber. In this manner, this sensor interface (including the LDC, MCU, DAC, and amplifier) may accurately measure a thickness of plate up on a wafer with a broader band of functional measurement than conventional systems. In some embodiments, the sensor interface is capable of measuring thickness of wafer plate up of up to 10 μm. This represents an extraordinary increase in sensing capabilities from conventional systems, that generally are only able to measure sub-micron thicknesses. Further, because of the inclusion of the digitization of the measurement immediately after the coil sensor, noise may be greatly reduced.

Figure 1:
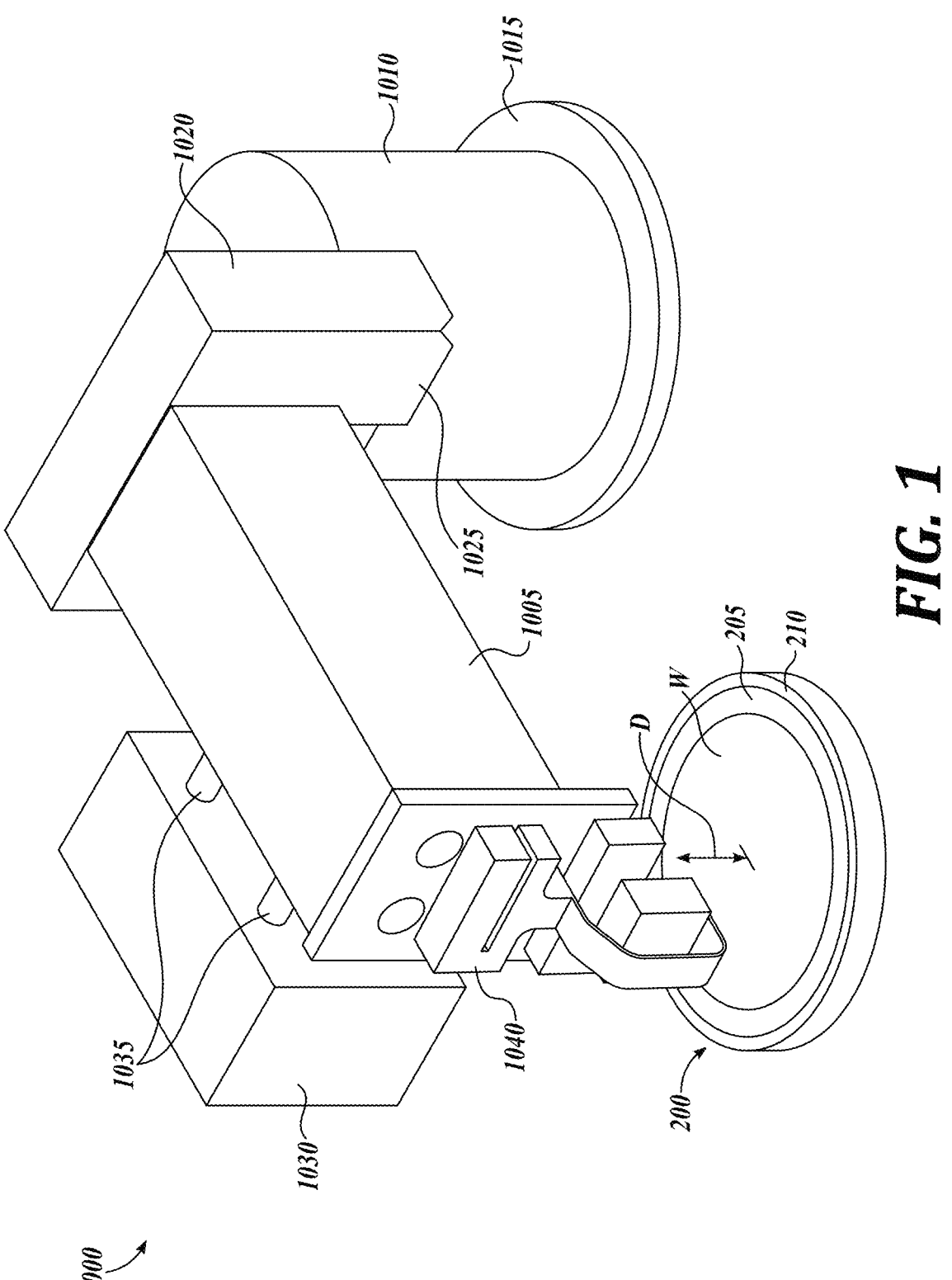
FIG. 1 is an example metrology chamber in accordance with the present technology.

FIG. 1 is an example metrology chamber 1000 in accordance with the present technology. In some embodiments, the metrology chamber 1000 includes a swing arm 1005, a guide 1010, a bearing clamp 1015, a guide cover 1020, an arm clamp 1025, a sensor interface housing 1030, one or more attachments 1035, and a sensor head assembly 1040. The metrology chamber 1000 may be configured to measure one or more metrics (also referred to as properties) of a wafer W. Metrics of the wafer W include, but are not limited to, thickness of plating on the wafer W, line width, and hole diameter. In some embodiments, the metrology chamber 1000 is configured to test the wafer W for acceptable quality before, during, or after: electroplating, adding contacts, adding or removing photoresist, or the like.

In some embodiments, the wafer W is housed in a wafer chuck 200. In some embodiments, the wafer chuck 200 includes a wafer housing 210 configured to surround the wafer W and an elastomer seal 205 configured to seal the wafer W into the wafer chuck 200 and prevent electroplating fluid or other contamination from entering the wafer chuck 200. The wafer W may be exposed to allow for electroplating, plate up thickness measurements, and the like.

In some embodiments, the metrology chamber 1000 includes a swing arm 1005. In some embodiments, the swing arm 1005 is configured to move the sensor head assembly 1040 above the wafer W (or wafer chuck 200). The guide 1010, the bearing clamp 1015, the guide cover 1020, the arm clamp 1025 may move together to position the swing arm 1005 above the wafer chuck 200.

Figure 4:
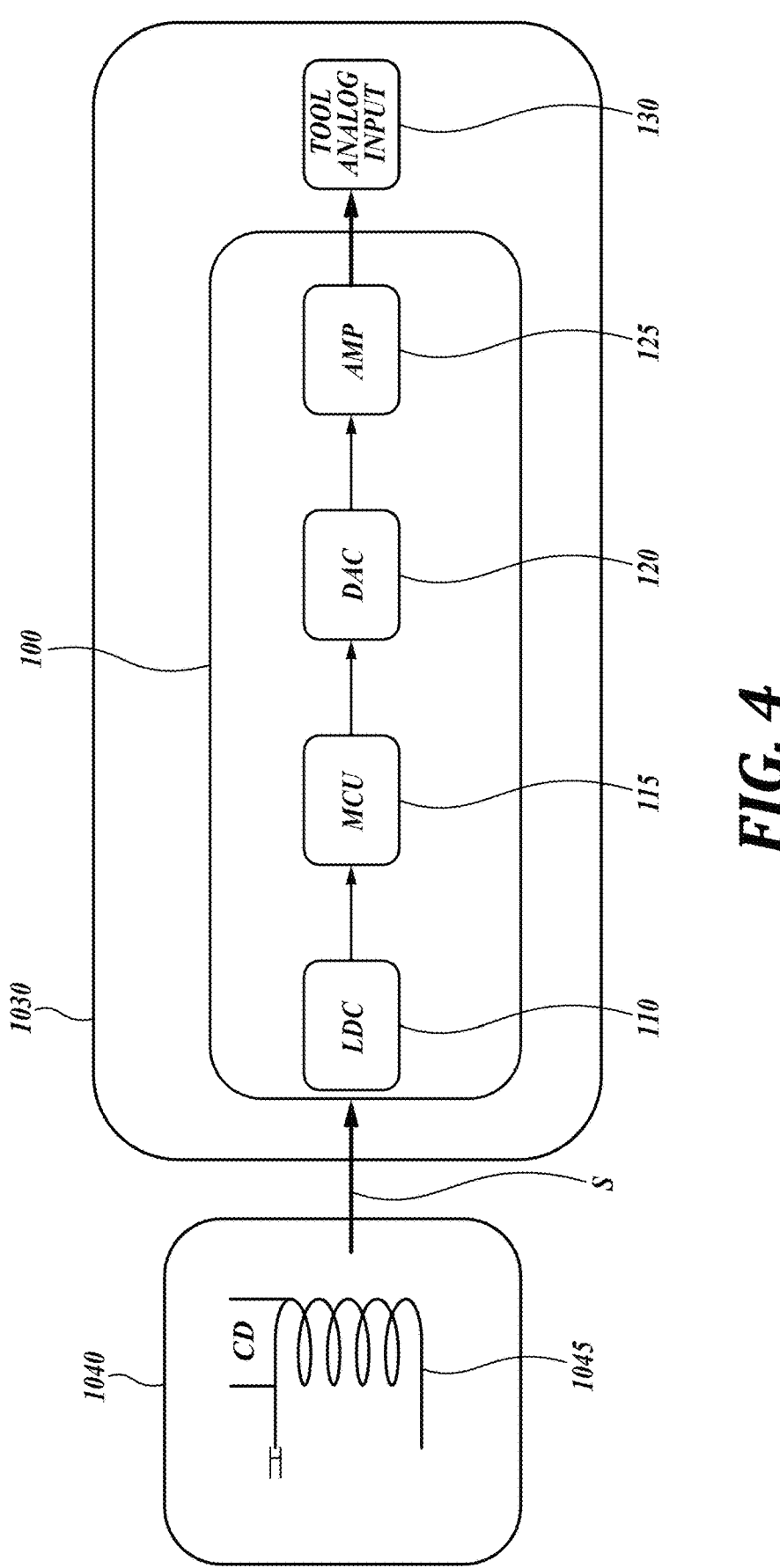
FIG. 4 is a simplified diagram of an example sensor head assembly in communication with an example sensor housing in accordance with the present technology.

In some embodiments, the swing arm 1005 is coupled with a sensor head assembly 1040. The sensor head assembly 1040 may include a passive sensor including a capacitor and an inductor (an LC sensor). In some embodiments, the swing arm 1005 may be positioned above the wafer W at a distance, such that the LC sensor is at a distance D from the wafer W. In some embodiments, the distance D is between about 1 mm and about 3 mm. In some embodiments, the distance is about 1.28 mm. In some embodiments, the LC sensor is a coil sensor (such as shown in FIG. 4). In some embodiments, the sensor head assembly 1040 is positioned above the wafer chuck 200 with the swing arm 1005. In some embodiments, the coil sensor is an inductive coil sensor and is configured to measure thickness of plating on the wafer W based on Eddy-Currents.

The metrology chamber 200 may further include a sensor interface housing 1030. The sensor interface housing 1030 is configured to retain a sensor interface (such as shown and described in FIGS. 2 and 4). As explained above, the inductive coil sensor itself may be carried by the sensor head assembly 1040. In some embodiments, the sensor housing 1030 is coupled to the swing arm 1005 with one or more attachments 1035. In some embodiments, the one or more attachments 1035 include screws, such as hex screws, bolts, anchors, rivets, or the like. In some embodiments, the sensor housing 1030 may be integrated into or permanently coupled with the swing arm 1005, such as by welding, soldering, or the like.

Figure 2A:
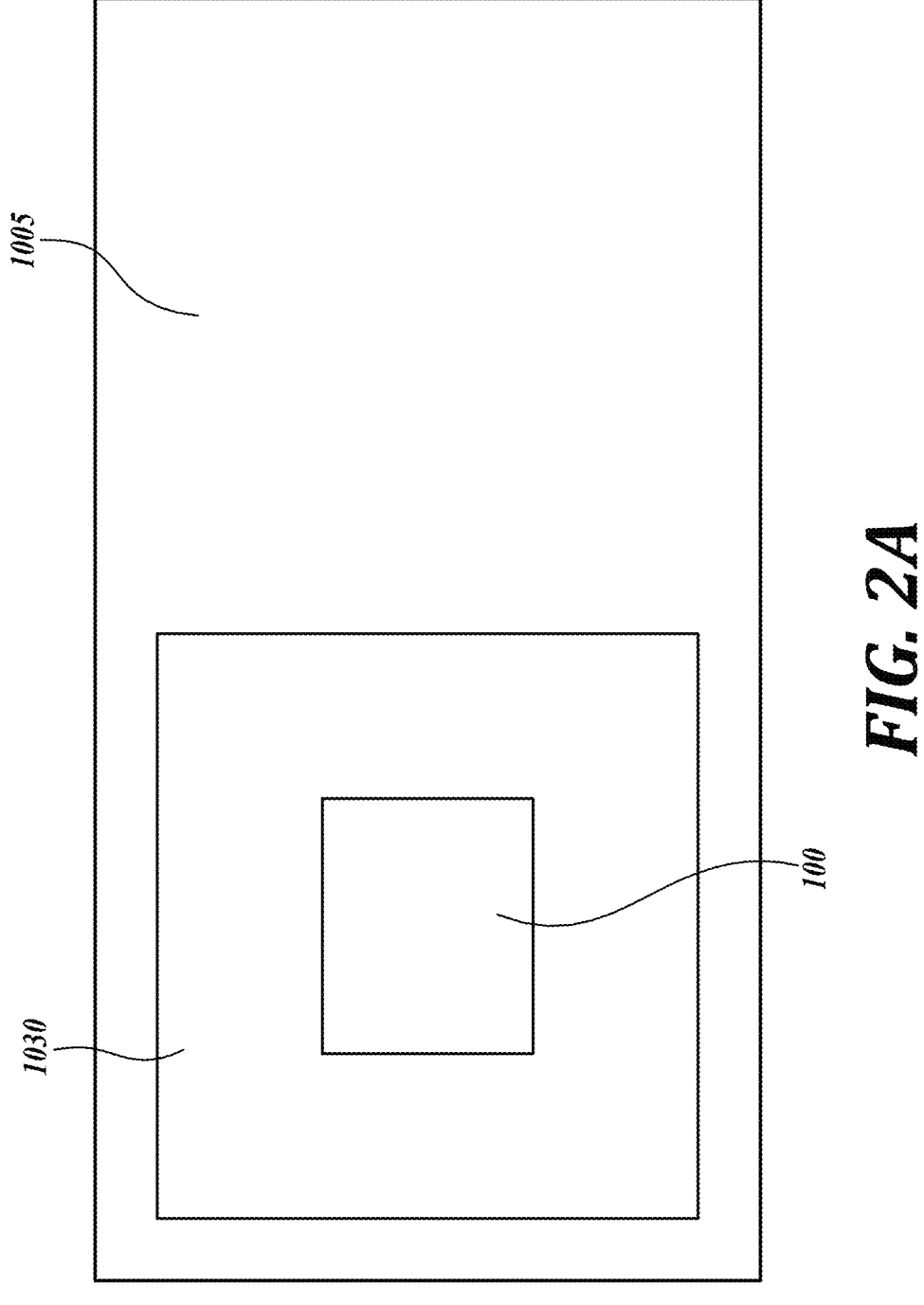
FIG. 2A is a close up front-right perspective of the sensor housing and swing arm of the example metrology chamber of FIG. 1, in accordance with the present technology.

FIG. 2A is a close up of the sensor housing 1030 and swing arm 1005 of the example metrology chamber of FIG. 1, in accordance with the present technology. FIG. 2A is a bottom view of the swing arm 1005 shown in FIG. 1. In some embodiments, sensor housing 1030 retains a sensor interface 100 as shown in detail in FIG. 2B. In some embodiments, the sensor interface 100 is a printed circuit board (PCB). In operation, the sensor interface 100 is configured to receive an input from a coil sensor (as shown in FIG. 4), and convert the input to data, convert the data to an analog signal, and output a 0-10V analog signal to an analog input, as described in detail herein. In this manner, this sensor interface 100 may accurately measure a thickness of plate up on a wafer (such as wafer W) with a broader band of functional measurement than the conventional systems are capable of producing.

Figure 2B:
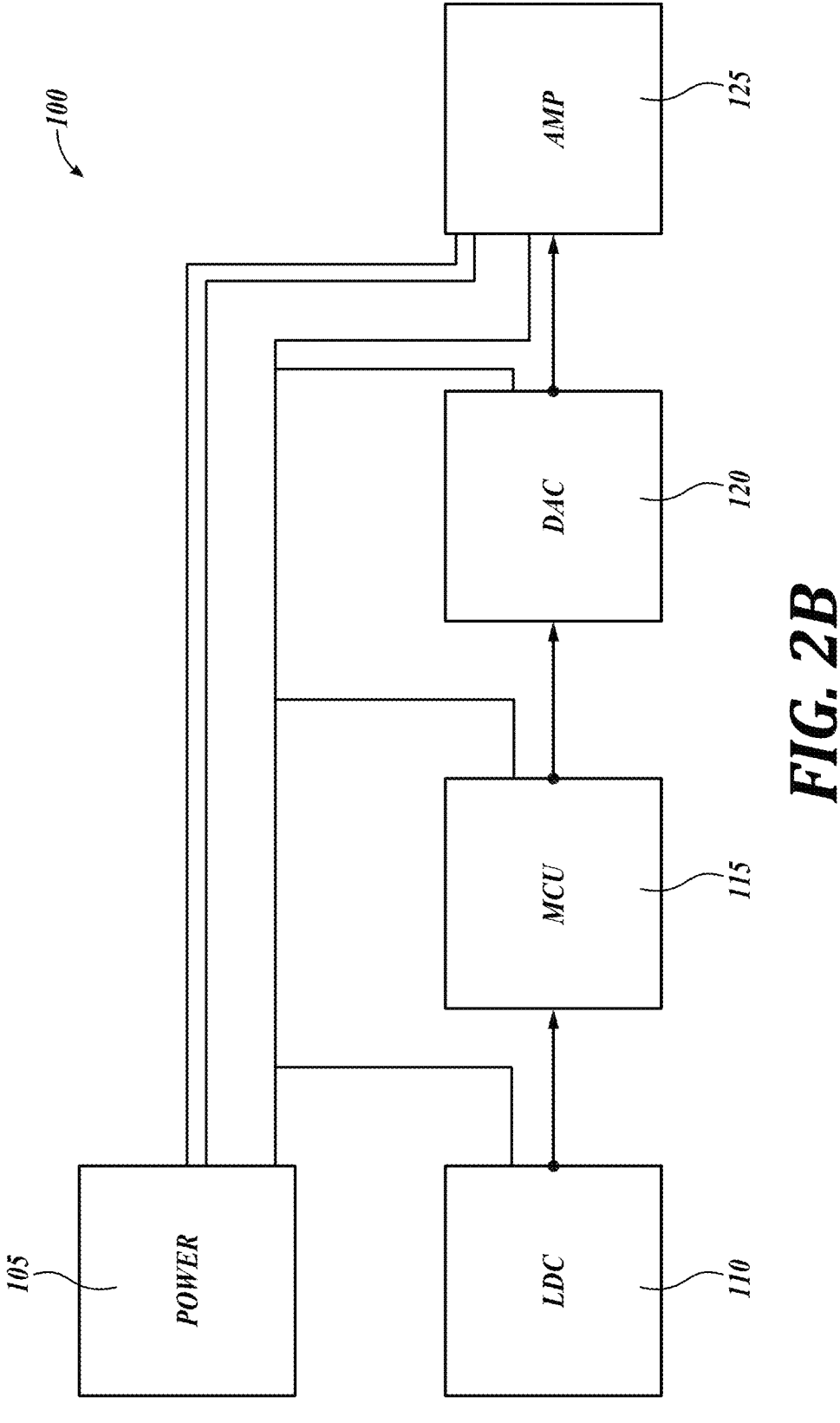
FIG. 2B is a block diagram of an example sensor interface, in accordance with the present technology.

FIG. 2B is a block diagram of an example sensor interface 100, in accordance with the present technology. In some embodiments, the sensor interface 100 includes a power source 105, an inductance to digital converter (LDC) 110, a microcontroller (MCU) 115, a digital to analog converter (DAC) 120, and an amplifier (AMP) 125. In some embodiments, the LDC 110, the MCU 115, the DAC 120, and the amplifier 125 are all independently coupled to the power source 105.

In some embodiments, the power source 105 is configured to provide a drain voltage to the amplifier 125. In some embodiments, the power source 105 provides voltage from −15 V to 15 V to the amplifier 125. In some embodiments, the power source 105 is further configured to provide power to the LDC 110, the MCU 115, the DAC 120, and the amplifier 125. In some embodiments, the power source 105 provides about 3.3 V to the LDC 110, the MCU 115, the DAC 120, and the amplifier 125. In some embodiments, the power source 105 is a 16 V high-power supply rejection ratio (PSRR) linear voltage regulator.

In operation, the LDC 110 is configured to receive an input from a coil sensor (such as shown in FIG. 4) and to convert the input to data (or "frame data"). In some embodiments, the LDC 110 converts the input to, for example, a 28-bit wide data frame made available on an inter-integrated circuit (I2C) bus address (not shown in FIG. 2B). In some embodiments, the LDC 110 is a Texas Instruments® (TI) LDC1612 or LDC1614 multi-channel 28-Bit inductance to digital converter. In some embodiments, the LDC 110 has an oscillation input range of about 1 kHz to 10 MHz. In some embodiments, the LDC 110 has a 1-100 kΩ alternating current (AC) resistance range. The high-resolution channels may allow for a much larger sensing range. Well-matched channels of the LDC 110 enable the use one channel to compensate sensing for environmental and aging conditions such as temperature, humidity, and mechanical drift.

In some embodiments, the MCU 115 is configured to receive the data from the LDC 110. In some embodiments, the MCU 115 is an advanced reduced instruction set computer (RISC) machine (ARM) MCU. In some embodiments, the MCU 115 is a STMicroelectronics® STM320 microcontroller. The MCU 115 may behave as a data transfer link between the LDC 110 and the DAC 120.

In some embodiments, the DAC 120 is configured to convert the data to an analog signal. In some embodiments, the DAC 120 converts the data to a 0-2.5 V analog signal. In some embodiments, the DAC is a TI DAC8560.

In some embodiments, the sensor interface 100 further includes an amplifier 125. In operation, the amplifier 125 is configured to receive the analog signal from the DAC 120 and output a 0-10V analog signal. In some embodiments, the 0-10 V analog signal is readable by an analog input (as shown in FIG. 4). The analog input may be integrated directly into the metrology chamber. In some embodiments, the amplifier 125 provides a selectable voltage offset and gain to match the analog output to the already integrated analog input. In some embodiments, the amplifier 125 is an TI OPA2992 amplifier.

In some embodiments, the sensor interface 100 may measure a thickness of wafer plate up of up to 10 μm. Conventional systems, including those with integrated analog inputs, are generally only capable of measuring submicron plating thicknesses. Further, the digitization of the measurement immediately after the coil sensor may also reduce noise of the analog signal, further improving accuracy of the thickness measurement.

FIGS. 3A-3D show example coil sensors 1045, in accordance with the present technology. The frequency of the coil sensor 1045 effects the sensing depth of the coil sensor. On the horizontal axes of FIGS. 3A-3D is the electric current (EC) density. On the vertical axes is depth. A front layer (such as a plating or metallization layer) and a substrate/rear layer of a wafer (such as wafer W is also illustrated).

Figures 3A, 3B:
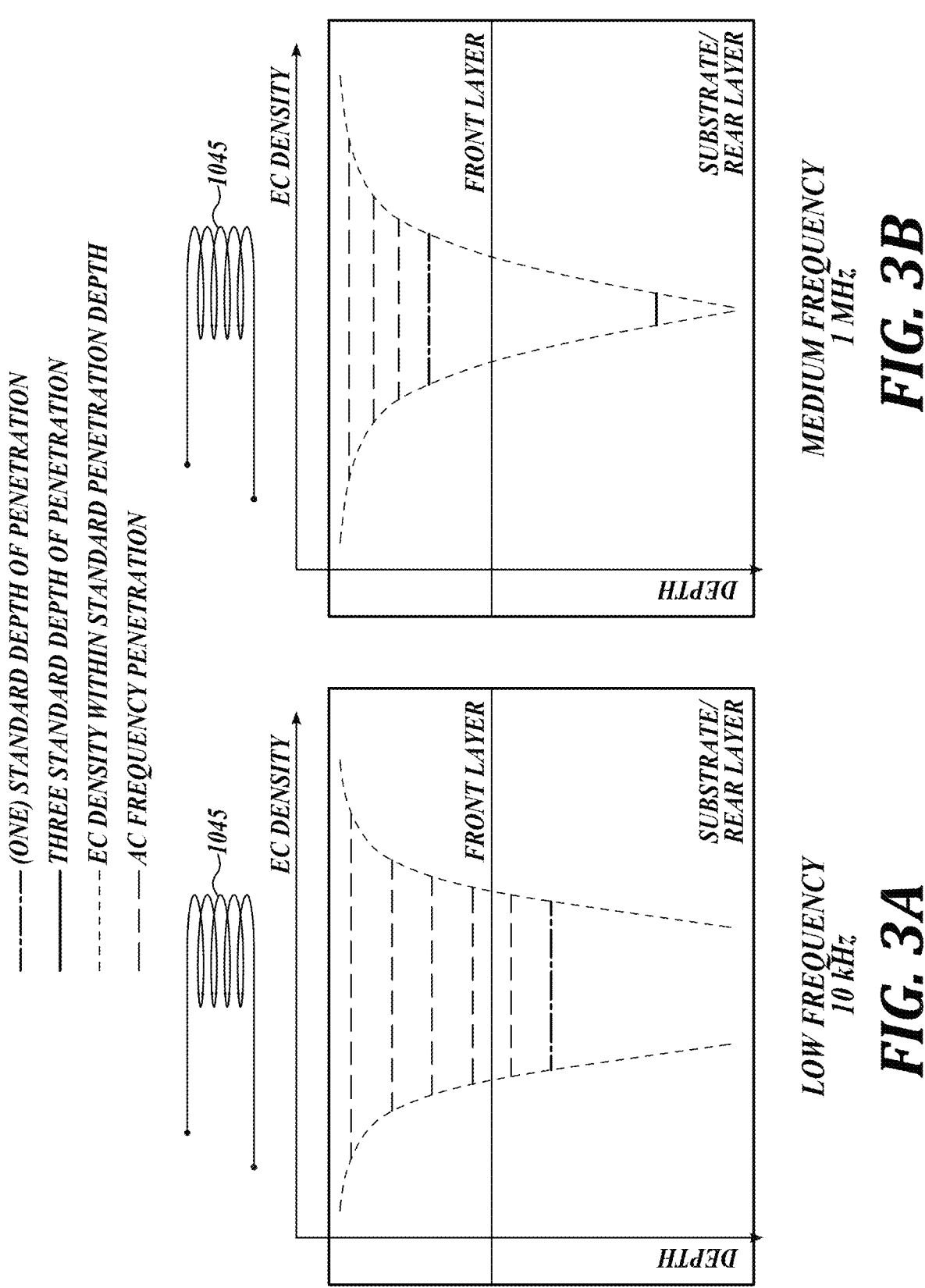
FIGS. 3A-3D show example coil sensors, in accordance with the present technology.
Figures 3C, 3D:
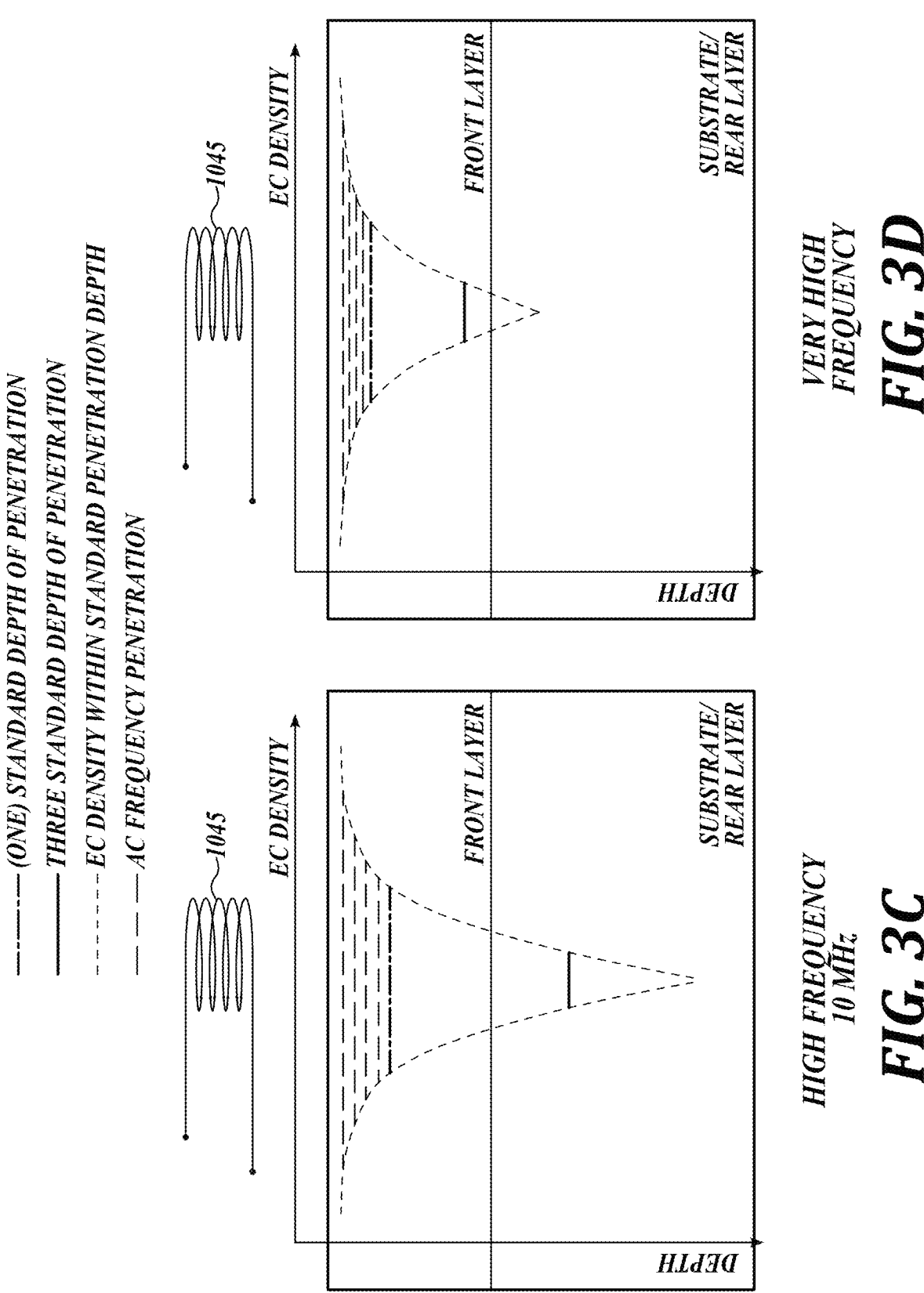

As shown in FIGS. 3A-3D, the coil sensor 1045 is configured to output an oscillation signal between 1 kHz and 10 MHz that is readable by the LDC 110. The frequency of the oscillation signal may be directly related to the sensing depth that can be achieved by the coil sensor 1045. For example, a low frequency, such as 10 kHz (as shown in FIG. 2A) may have a deeper depth of penetration than a high frequency, such as, for example, 10 MHz (FIG. 3C). Further, a medium frequency, such as 1 MHz (FIG. 3B) provides a sensing depth between that of a low frequency or a high frequency, such as 10 MHz (FIG. 3D).

In this manner, adjusting the frequency of the oscillation signal of the coil sensor can adjust the sensing depth of the coil sensor. This allows for measuring the thickness of a metallization layer on the wafer of up to 10 μm.

FIG. 4 is a simplified diagram of an example sensor head assembly 1040 in communication with an example sensor housing 1030, in accordance with the present technology. In some embodiments, the sensor head assembly 1040 and the sensor housing 1030 are communicatively coupled.

In some embodiments, the sensor head assembly 1040 includes a coil sensor 1045 having a coil diameter CD. The coil diameter CD may affect the precision of the thickness measurement of plate up on a wafer (such as wafer W). In some embodiments, a ratio between the coil diameter CD and the distance between the sensor head assembly 1040 and a wafer (such as distance D in FIG. 1) determines a precision of an inductance to digital converter (LDC) 110. In some embodiments, the coil sensor 1045 has a coil diameter CD of about 1 mm to about 3 mm. In some embodiments, the coil sensor 1045 has a coil diameter CD of about 2.5 mm. In some embodiments, the coil sensor 1045 is configured to output an oscillation signal S between 1 kHz and 10 kHz that is readable by the LDC 110. The frequency of the oscillation signal may be directly related to the sensing depth that can be achieved by the coil sensor 1045. For example, a low frequency, such as 10 kHz may have a deeper depth of penetration and a high frequency, such as, for example, 10 MHz.

In operation the LDC 110 converts the oscillation frequency into data, which read into a microcontroller (MCU) 115. The MCU 115 acts as a communication link between the LDC 110 and a digital to analog converter (DAC) 120. The DAC 120 converts the data to an analog signal. Once the analog signal is achieved, an amplifier 125 may amplify the analog signal by providing a selectable voltage offset and gain of the analog signal. In this manner, the amplifier 125 outputs a 0-10V analog signal. This 0-10V analog signal may then be transmitted to an analog input 130 integrated in the metrology chamber. In this manner, with the use of the sensor interface 100, the analog input 130 can precisely determine the thickness of plating on the wafer (such as wafer W).

Figure 5:
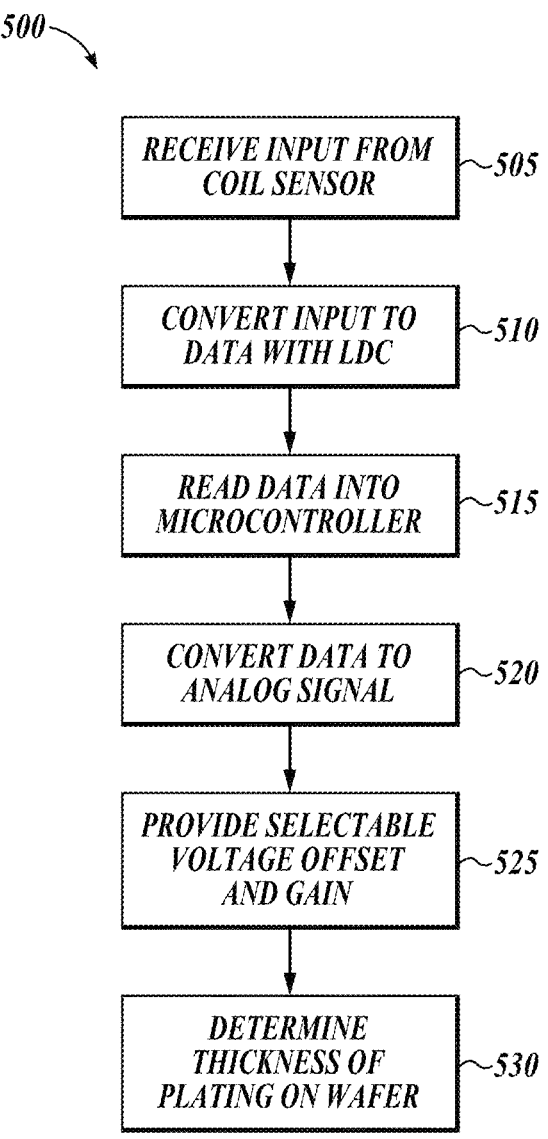
FIG. 5 is an example method of determining a thickness of plating on a wafer, in accordance with the present technology.

FIG. 5 is an example method 500 of determining a thickness of plating on a wafer, in accordance with the present technology. In some embodiments, the method 500 is carried out in a metrology chamber (such as metrology chamber 2000). In some embodiments, the metrology chamber includes a swing arm (such as swing arm 1005), a guide (such as guide 1010), a bearing clamp (such as bearing clamp 1015), a guide cover (such as guide cover 1020), an arm clamp (such as arm clamp 1025), a sensor housing (such as sensor housing 1030), one or more attachments (such as one or more attachments 1035), and a sensor head assembly (such as sensor head assembly 1040). In some embodiments, the sensor head assembly may include a coil sensor (such as coil sensor 1045) having a coil diameter (such as coil diameter CD). In some embodiments, the sensor housing may retain a sensor interface (such as sensor interface 100). The sensor interface may include a power source (such as power source 105), an inductance to digital converter (LDC) (such as LDC 110), a microcontroller (MCU) (such as MCU 115), a digital to analog convertor (DAC) (such as DAC 120), and an amplifier (such as amplifier 125). In some embodiments, the sensor interface may communicate with an analog input (such as analog input 130). In some embodiments, the analog input may be retained in the sensor housing or otherwise integrated into the metrology chamber.

In block 505, an input is received by the LDC from the coil sensor. In some embodiments, the input is an oscillation frequency. In some embodiments, the input is directly affected by the coil diameter of the coil sensor and/or a distance (such as distance D) that the coil sensor (or sensor head assembly) is from a wafer (such as wafer W) and/or a wafer chuck (such as wafer chuck 200).

In block 510, the input is converted to data by the LDC. In some embodiments, the input is converted to data that is a 28-bit wide data frame. In some embodiments, the LDC has an oscillation input range of about 1 kHz to 10 MHz. In some embodiments, the LDC has a 1-100 kΩ alternating current (AC) resistance range.

In block 515, the data is read into the MCU. In some embodiments, the MCU acts as a communication link between the LDC and the DAC.

In block 520, the data is converted into an analog signal with the DAC. In some embodiments, the data is converted into a 0-2.5V analog signal.

In block 525, a selectable voltage offset and gain is provided by the amplifier. In some embodiments, the amplifier is configured to convert the analog signal from the DAC into a 0-10V analog signal, readable by the analog input.

In block 530, the thickness of plating (or plate up) on the wafer is determined. In some embodiments, this is achieved by transmitting the 0-10V analog signal to the analog input. In some embodiments, the method described herein is capable of measuring thickness of wafer plate up of up to 10 μm.

It should be understood that method 500 should be interpreted as merely representative. In some embodiments, process blocks of method 500 may be performed simultaneously, sequentially, in a different order, or even omitted, without departing from the scope of this disclosure.

The present application may reference quantities and numbers. Unless specifically stated, such quantities and numbers are not to be considered restrictive, but representative of the possible quantities or numbers associated with the present application. Also, in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

Embodiments disclosed herein may utilize circuitry in order to implement technologies and methodologies described herein, operatively connect two or more components, generate information, determine operation conditions, control an appliance, device, or method, and/or the like. Circuitry of any type can be used. In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof.

An embodiment includes one or more data stores that, for example, store instructions or data. Non-limiting examples of one or more data stores include volatile memory (e.g., Random Access memory (RAM), Dynamic Random Access memory (DRAM), or the like), non-volatile memory (e.g., Read-Only memory (ROM), Electrically Erasable Programmable Read-Only memory (EEPROM), Compact Disc Read-Only memory (CD-ROM), or the like), persistent memory, or the like. Further non-limiting examples of one or more data stores include Erasable Programmable Read-Only memory (EPROM), flash memory, or the like. The one or more data stores can be connected to, for example, one or more computing devices by one or more instructions, data, or power buses.

In an embodiment, circuitry includes a computer-readable media drive or memory slot configured to accept signal-bearing medium (e.g., computer-readable memory media, computer-readable recording media, or the like). In an embodiment, a program for causing a system to execute any of the disclosed methods can be stored on, for example, a computer-readable recording medium (CRMM), a signal-bearing medium, or the like. Non-limiting examples of signal-bearing media include a recordable type medium such as any form of flash memory, magnetic tape, floppy disk, a hard disk drive, a Compact Disc (CD), a Digital Video Disk (DVD), Blu-Ray Disc, a digital tape, a computer memory, or the like, as well as transmission type medium such as a digital and/or an analog communication medium (e.g., a fiber optic cable, a waveguide, a wired communications link, a wireless communication link (e.g., transmitter, receiver, transceiver, transmission logic, reception logic, etc.). Further non-limiting examples of signal-bearing media include, but are not limited to, DVD-ROM, DVD-RAM, DVD+RW, DVD-RW, DVD-R, DVD+R, CD-ROM, Super Audio CD, CD-R, CD+R, CD+RW, CD-RW, Video Compact Discs, Super Video Discs, flash memory, magnetic tape, magneto-optic disk, MINIDISC, non-volatile memory card, EEPROM, optical disk, optical storage, RAM, ROM, system memory, web server, or the like.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Generally, the embodiments disclosed herein are non-limiting, and the inventors contemplate that other embodiments within the scope of this disclosure may include structures and functionalities from more than one specific embodiment shown in the figures and described in the specification.

In the foregoing description, specific details are set forth to provide a thorough understanding of exemplary embodiments of the present disclosure. It will be apparent to one skilled in the art, however, that the embodiments disclosed herein may be practiced without embodying all the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "vertical," "horizontal," "front," "rear," "left," "right," "top," and "bottom," etc. These references, and other similar references in the present application, are intended to assist in helping describe and understand the particular embodiment (such as when the embodiment is positioned for use) and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value. The term "based upon" means "based at least partially upon."

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

While illustrative embodiments have been illustrated and described, it will be appreciated that various changes can be made therein without departing from the spirit and scope of the invention.

What is claimed is:

1. A sensor interface for determining a thickness of plating on a wafer, the sensor interface comprising:
    an inductance to digital converter (LDC) configured to receive an input from a coil sensor, and configured to convert the input to data;
    a microcontroller (MCU) configured to receive the data and to convert the data into digital data;
    a digital to analog convertor (DAC) configured to convert the digital data to an analog signal; and
    an amplifier configured to amplify an input voltage range of the analog signal to an output voltage range of the analog signal, wherein the output voltage range is greater than the input voltage range.

2. The sensor interface of claim 1, further configured for outputting an output of the amplifier to an analog sensor, wherein the output voltage range of the amplifier is a 0-10 V analog signal, and wherein the analog sensor is configured to determine the thickness of plating on the wafer based on the 0-10 V analog signal.

3. The sensor interface of claim 1, wherein the LDC has an oscillation input range of about 1 kHz to 10 MHz.

4. The sensor interface of claim 1, wherein the LDC has a 1-100 kΩ alternating current (AC) resistance range.

5. The sensor interface of claim 1, wherein the data is a 28-bit wide data frame.

6. The sensor interface of claim 1, wherein the input is an oscillation frequency.

7. The sensor interface of claim 1, wherein the data is transmitted through an inter-integrated circuit (I2C) bus address.

8. The sensor interface of claim 1, wherein the DAC converts the digital data to a 0-2.5V analog signal.

9. A metrology chamber configured to retain a wafer chuck, the metrology chamber comprising:
    a sensor head assembly comprising a coil sensor configured to measure an oscillation frequency of a wafer;
    a swing arm configured to position the sensor head assembly above the wafer chuck; and
    a sensor interface configured to determine a thickness of plating on a wafer, comprising:
        an inductance to digital converter (LDC) configured to receive an input from the coil sensor, and configured to convert the input to data;
        a microcontroller (MCU) configured to receive the data and to convert the data into digital data;
        a digital to analog convertor (DAC) configured to convert the digital data to an analog signal; and
        an amplifier configured to amplify an input voltage range of the analog signal to an output voltage range of the analog signal, wherein the output voltage range is greater than the input voltage range, and
    an analog sensor configured to determine the thickness of plating on the wafer based on the output voltage range of the analog signal.

10. The metrology chamber of claim 9, wherein the DAC converts the digital data to a 0-10 V analog signal or a 0-2.5 V analog signal.

11. The metrology chamber of claim 9, wherein the metrology chamber further comprises a sensor housing configured to retain the sensor interface.

12. The metrology chamber of claim 9, wherein the sensor interface comprises a printed circuit board (PCB).

13. The metrology chamber of claim 9, wherein the coil sensor has a diameter of about 1 to 3 mm.

14. The metrology chamber of claim 9, wherein the swing arm is configured to position the sensor head assembly about 1 to 3 mm above the wafer chuck.

15. A method of determining a thickness of plating on a wafer with a sensor interface comprising an inductance to digital converter (LDC), a microcontroller (MCU), a digital to analog convertor (DAC), and an amplifier, the method comprising:
    converting an oscillation frequency into data with the LDC;
    reading the data into the MCU and converting the data into digital data;
    converting the digital data to an analog signal with the DAC;
    applying a selectable voltage offset and a gain to the analog signal with the amplifier;
    outputting the analog signal by the amplifier to an analog input, wherein an output voltage range of the analog signal is greater than an input voltage range of the analog signal; and
    determining the thickness of plating on the wafer.

16. The method of claim 15, further comprising measuring the oscillation frequency with a coil sensor.

17. The method of claim 15, wherein determining the thickness of plating on the wafer comprises:
    determining the thickness of plating on the wafer based on a 0-10 V analog signal by an analog sensor.

18. The method of claim 15, wherein the LDC has an oscillation input range of about 1 kHz to 10 MHz.

19. The method of claim 15, wherein the data is a 28-bit wide data frame.

20. The method of claim 15, wherein the DAC converts the digital data to a 0-2.5 V analog signal.

* * * * *